No. 692,767. Patented Feb. 4, 1902.
J. CHIAL.
COMBINED HORSE DETACHER AND BRAKE FOR VEHICLES.
(Application filed Oct. 7, 1901.)
(No Model.)
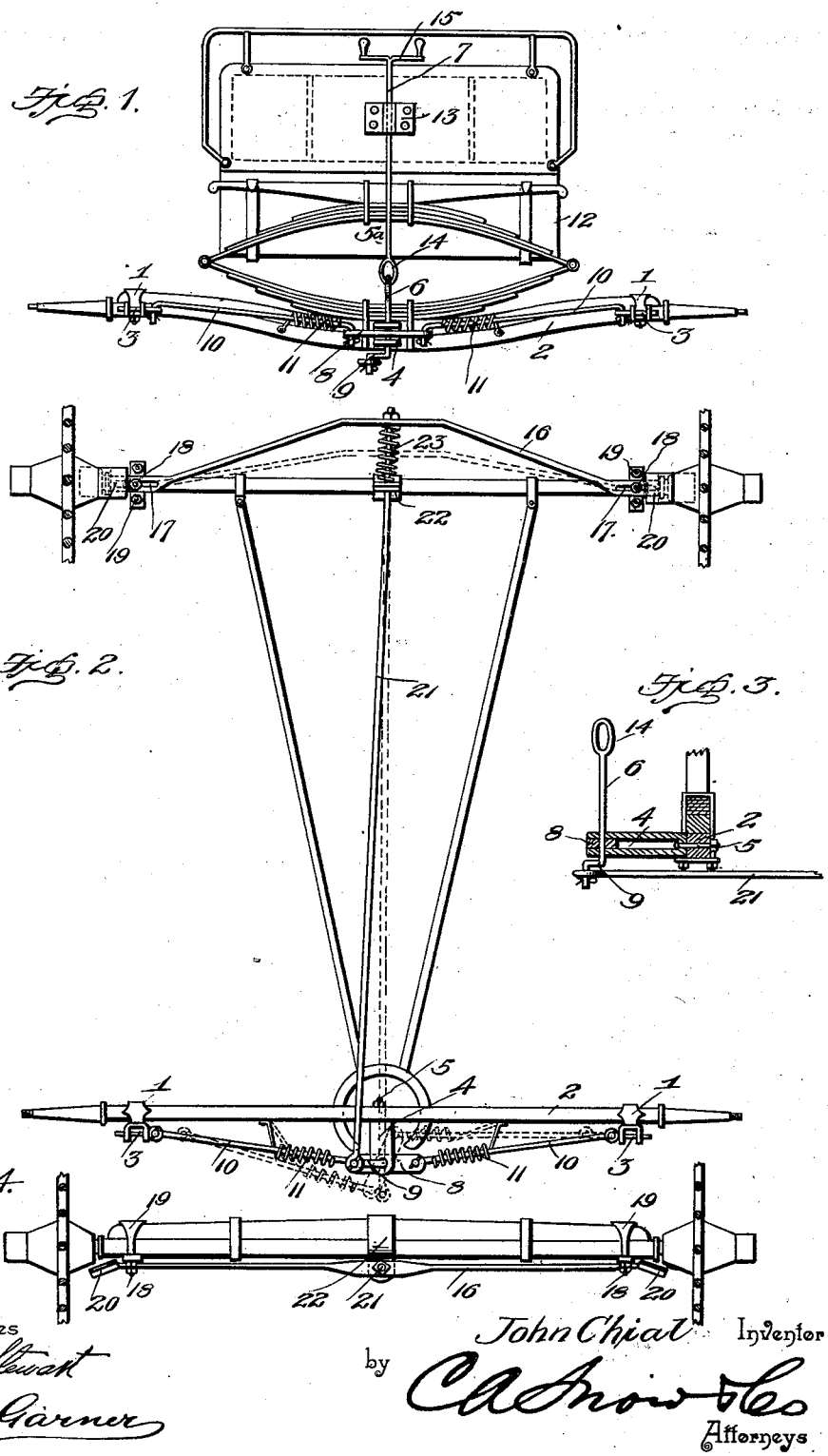

UNITED STATES PATENT OFFICE.

JOHN CHIAL, OF LAKEPARK, MINNESOTA.

COMBINED HORSE-DETACHER AND BRAKE FOR VEHICLES.

SPECIFICATION forming part of Letters Patent No. 692,767, dated February 4, 1902.

Application filed October 7, 1901. Serial No. 77,883. (No model.)

*To all whom it may concern:*

Be it known that I, JOHN CHIAL, a citizen of the United States, residing at Lakepark, in the county of Becker and State of Minnesota, have invented a new and useful Combined Horse-Detacher and Brake for Vehicles, of which the following is a specification.

My invention is an improved combined horse-detacher and brake for vehicles by means of which the tongue or thills may be detached from the vehicle when the team or horse is running away and whereby the brakes may be simultaneously applied to arrest the motion of the vehicle.

My invention consists in the peculiar construction and combination of devices hereinafter fully set forth and claimed.

In the accompanying drawings, Figure 1 is a front elevation of a vehicle provided with my improved horse-detaching and brake apparatus, the thills and wheels being omitted. Fig. 2 is an inverted diagrammatic plan view of the running-gear of the vehicle provided with my improved horse-detaching and brake apparatus. Fig. 3 is a vertical transverse section through the front axle and the bracket which forms the bearing for the lower section of the operating-shaft. Fig. 4 is a detail view of the rear axle, showing the spring brake-bar thereon.

In the embodiment of my invention here shown the clips 1 on the front axle 2 are provided with locking and releasing bolts or pins 3, by means of which the tongue or thills may be attached to the front axle or detached therefrom. From the front side of the front axle, at the center thereof, projects a bracket 4, which is substantially in the form of the letter U, and is here shown as secured to the axle by a bolt 5. The lower section 6 of an operating rod or shaft $5^a$ has its bearings in openings in the arms of the said bracket 4, and on that portion of the said section 6 between the said arms is secured a cross-arm 8. The same is fast to and adapted to turn with the said section 6. The latter has a crank-arm 9 at its lower end. The releasing-bolts 3 are connected to the ends of the cross-arm 8 by rods 10, and on the said rods are coiled springs 11, which are secured at one end to said rods and the opposite ends of which are secured to the axle 2. The said springs serve to keep the releasing-bolts normally in position to connect the tongue or thills to the clips 1 and keep the cross-arm 8 normally parallel with the front axle, as shown in Figs. 1 and 2.

On the body 12 of the vehicle, which is supported by springs, as indicated in the drawings, is a bearing 13 for the upper section 7 of the operating rod or shaft $5^a$. As here shown, the said bearing is secured on the front side of the dashboard; but within the scope of my invention the said bearing may be otherwise located, and I do not limit myself in this particular. The said sections 6 7 of the operating rod or shaft are connected together by eyes 14, which engage each other, whereby lost motion is provided between the said sections to adapt the upper section, which is carried by the spring-supported body, to move with the body without affecting the lower section 6. A handle or lever 15 is shown at the upper end of the upper section 7, by means of which the operating rod or shaft may be turned to withdraw the releasing-bolts 3, and thereby detach the tongue or thills from the vehicle in the event that the team or horse is running away.

A bent spring brake-bar 16 is here shown as connected to the rear axle of the vehicle; but the same may be connected to the front axle or to any other appropriate support. The said bent spring brake-bar is provided near its ends with longitudinal slots 17, which are here shown as engaged by bolts 18, with which clips 19 on the rear axle are provided, and at the ends of the said bent spring brake-bar are secured brake-shoes 20. The said bent spring brake-bar is bowed at its central portion, as shown, and to the same is connected a rod 21, which runs through a guide 22, here shown as secured to the rear axle, the front end of the said rod being connected to the crank-arm 9 of the operating shaft or rod $5^a$. A coiled or other suitable spring 23 bears against the spring brake-bar and supplements the inherent resilience to keep the same normally bowed or arched to its maximum extent in order to keep the brake-shoes out of contact with the wheels.

It will be understood from the foregoing description in connection with the drawings that when the operating shaft or rod is turned to detach the tongue or thills from the vehicle the crank-arm 9 and connection 21 will tend to straighten the bent, bowed, or arched brake-bar, thereby elongating the latter and applying the brake-shoes to the wheels. As here shown, the brake-shoes are adapted to operate on the hubs of the vehicle; but within the scope of my invention they may be adapted to operate on the rims or tires of the wheels, and I do not desire to limit myself in this particular.

Having thus described my invention, I claim—

1. In a vehicle, the combination of a movable operating element, a bowed spring-bar attached to a support and having brake-shoes at its ends, supports for the end portions of said bent spring-bar, whereby said end portions thereof are adapted for longitudinal movement and a connection between said operating element and said arched or bent spring-bar, substantially as described.

2. In a vehicle, the combination of a movable operating element, releasing devices for the tongue or thills, connected thereto and operated thereby, a flexible bowed brake-bar, supports and guides for the ends thereof to permit longitudinal movement of the said ends of said brake-bar, brake-shoes operated by the longitudinal movement of the ends of said brake-bar, and a connection between the said brake-bar and the said movable operating element, substantially as described.

3. In a vehicle, the combination of a movable operating element, releasing devices for the tongue or thills, connected thereto and operated thereby, a flexible bowed brake-bar, supports and guides for the end portions thereof to permit longitudinal movement of the said end portions, brake-shoes operated by the longitudinal movement of said end portions of said bowed brake-bar, a spring to normally bow said bar and draw the ends thereof inwardly and a connection between the said bowed brake-bar and the said movable operating element, to straighten said bent or bowed bar and thereby extend the ends thereof to apply the brakes, when said operating element is moved, substantially as described.

In testimony that I claim the foregoing as my own I have hereto affixed my signature in the presence of two witnesses.

JOHN CHIAL.

Witnesses:
B. HANSSON,
C. A. OLSON.